United States Patent [19]

Takasaki

[11] Patent Number: 4,972,869

[45] Date of Patent: Nov. 27, 1990

[54] VENT VALVE

[76] Inventor: Junichi Takasaki, 3413-6, Hishimachikurokawa, Kiryu-shi, Gunma, Japan

[21] Appl. No.: 433,518

[22] Filed: Nov. 8, 1989

[30] Foreign Application Priority Data

Nov. 9, 1988 [JP] Japan .......................... 63-146976[U]

[51] Int. Cl.$^5$ ........................................... F16K 24/04
[52] U.S. Cl. .................................... 137/199; 137/202
[58] Field of Search ................... 137/199, 202, 533.11, 137/533.13, 454.2

[56] References Cited

U.S. PATENT DOCUMENTS 4,457,325  7/1984  Green ............................. 137/202 X Primary Examiner—Alan Cohan
Attorney, Agent, or Firm—Rodman & Rodman

[57] ABSTRACT

A vent valve wherein a valve opening to be opened or closed by a valve body is provided at its one axial end, and the other end is opened for a fluid passage and concaved toward inside at its three portions, thereby the valve body being prevented from falling off. The vent valve is used for ejecting air out of the fuel passage for a vehicle fuel pump. On the valve opening side of the barrel, a step portion is provided to divide the barrel into the valve body moving portion, where the valve body moves to open or close the valve opening, and a valve body storing portion having a larger diameter than that of the valve body moving portion. On this valve body storing portion having a larger diameter, the barrel is pressed into the vent passage.

7 Claims, 2 Drawing Sheets

VENT VALVE

BACKGROUND OF THE INVENTION

1. Field of the Invention

The present invention relates to a vent valve, and more particularly to a vent valve for a fuel pump which is effective for purging air out of a fuel passage in a vehicle fuel pump.

2. Prior Art

Conventionally, a vehicle fuel pump is generally provided with a vent valve for purging air out of a fuel passage in a vehicle fuel pump. One of such conventional vent valves is shown in FIG. 4.

As shown, this conventional vent valve 1 comprises a barrel 2 formed to be of substantially cylindrical shape and a steel ball 3 inserted from an opening 4 into the barrel 2, this steel ball effecting as a valve body. The steel ball 3 opens or closes a valve opening 5 of the barrel 2 according to the output of fuel. That is, the vent valve 1 is placed in a vent passage branched off from the fuel passage in a manner that the valve opening 5 is directed upward. The steel ball 3 is at a lower position in the barrel by its own weight, when the fuel pump is started to operate. Thus, air is ejected out of the pump through the valve opening 5, and then, as the vent passage is filled with fuel, the steel ball 3 closes the valve opening 5.

When, however, the barrel 2 is set into the vent passage, the barrel is pressed into the vent passage, and, accordingly, a closed wall at the upper portion of the barrel 2 can deform because the barrel 2 is of substantially cylindrical shape. Therefore, some fuel may leak when the pump sends out the fuel, because the barrel 2 is deformed and a gap is formed between a valve seat portion 6 around the valve opening 5 and the steel ball 3, making it impossible for the steel ball 3 to close the valve opening 5 hermetically.

SUMMARY OF THE INVENTION

It is, therefore, an object of the present invention to provide a vent valve, wherein it is possible to prevent a valve seat portion around a valve opening from being deformed when a barrel is pressed into the vent passage.

The vent valve according to the invention comprises a barrel to be inserted into a vent passage branched off a fluid passage, the barrel being of a substantially cylindrical form, and constructed such that one end in the axial direction of the barrel constitutes a closed wall, and the other end is open; a valve opening formed in the closed wall; and a valve body inserted into the barrel. The vent valve further comprises a step portion formed on the valve opening side of the barrel, said step portion dividing the barrel into a valve body moving portion where the valve body moves to close the valve opening and a valve body storing portion having a larger diameter than the valve body moving portion.

Because of this step portion, when the abovedescribed vent valve of the present invention is pressed into the vent passage, deformation does not extend to the valve body moving portion of the barrel even if deformation occurs in the valve body storing portion. Thus, sealing property of the valve seat portion around the valve opening is assured.

BRIEF DESCRIPTION OF THE DRAWINGS

The above and other objects and features of the present invention will become more apparent when referred to the following descriptions given in conjunction with the accompanying drawings, wherein like reference numerals denote like elements, and in which.

DETAILED DESCRIPTION OF THE PREFERRED EMBODIMENTS

Figure 1:
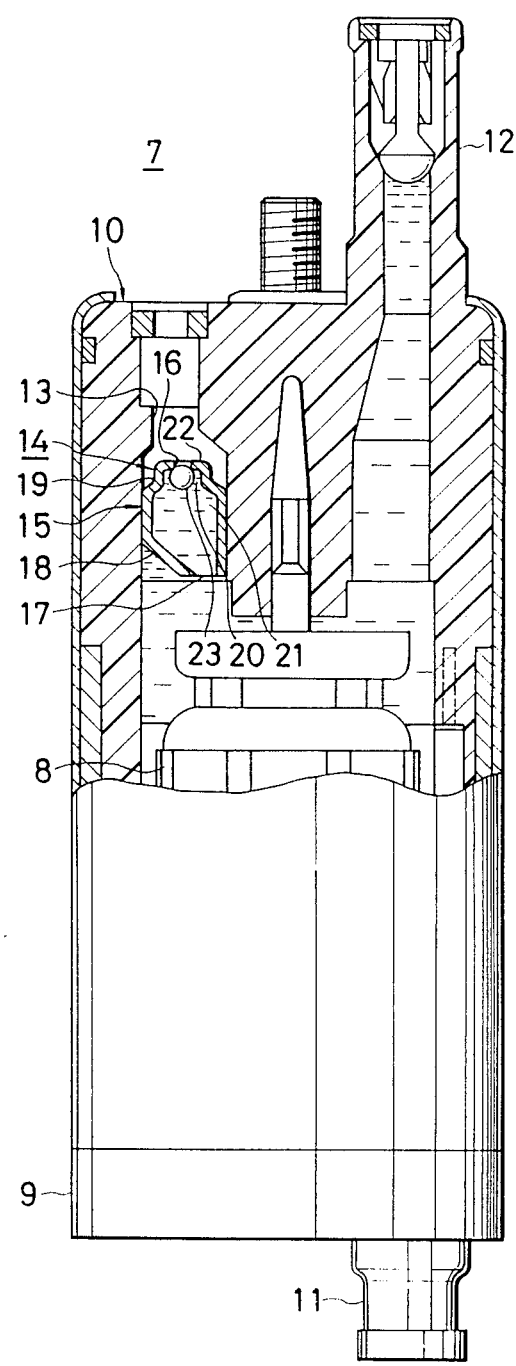
FIG. 1 is a partially-cut elevational view showing a fuel pump employing a vent valve according to an embodiment of the invention.
Figure 4:
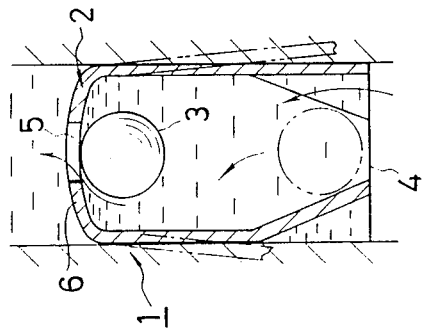
FIG. 4 is an enlarged sectional view showing a prior art.

Referring to the drawings, a vent valve according to the invention is used for a vehicle fuel pump 7, which is located on the bottom of a fuel tank (not shown). The fuel pump 7 includes a motor 8, a vane pump 9, both of which are integrally connected with each other, and a housing 10. In the housing 10, a fuel passage 11 on a intake side is opened at the lower portion where the vane pump is arranged, and a fuel passage 12 on an ejecting side is opened at the upper portion where the motor is arranged. Further, on the top of the housing 10, a vent passage 13 is branched off from the ejecting side fluid passage 12 so as to communicate the inside and the outside of the housing 10.

Figure 3:
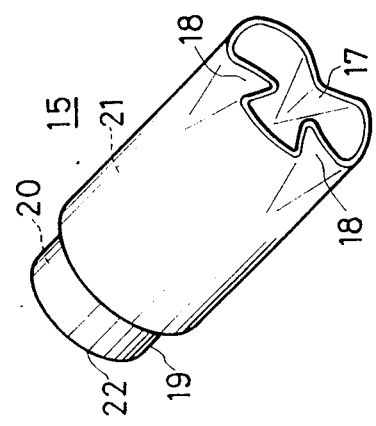
FIG. 3 is a perspective view showing a barrel of the vent valve.

According to the present embodiment, a vent valve 14 is inserted into the vent passage 13 to open or close the vent passage 13 according to the fuel pressure in the vent passage 13. The vent valve 14 includes a barrel 15 and a steel ball 23 as a valve body, which is inserted into a barrel 15. The barrel 15 is formed to be substantially cylindrical form such that one end of the barrel in the axial direction constitutes a closed wall which can be closed by the steel ball 23, while the other end is open. In the closed wall of the barrel 15, a valve opening 16 having a smaller diameter than the steel ball 23 is provided concentrically to the closed wall and makes the inside of the barrel communicate with the outside. In the other end of the barrel 15, an opening 17 with a slightly smaller diameter than the steel ball 23 is formed. That is, as shown in FIG. 3, the opening 17 side of the barrel 15 is bent toward inside on three portions 18 thereof to be a shape like a three leaf clover, resulting in forming an opening 17 with a smaller diameter than that of the steel ball 23. Thus, falling of the steel ball 23 from the barrel 15 is prevented by the bent portions 18.

A step portion 19 is formed on the valve opening 16 side of the barrel 15. The step portion 19 divides the barrel 15 into a valve body moving portion 20, in which the valve opening 16 can be closed, and a valve body storing portion 21 with a larger diameter than that of the valve body moving portion 20. The valve body moving portion 20 is constructed such that the valve opening 16 can be closed by the steel ball 15 according to the fuel pressure.

Next, operation of the embodiment will be described.

Figure 2:
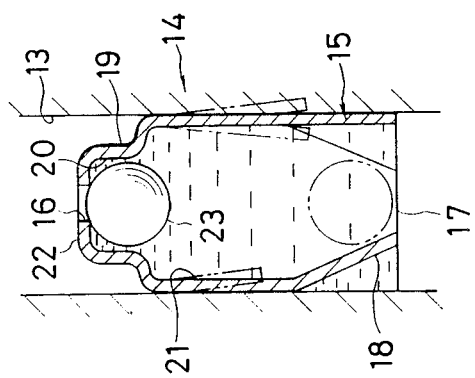
FIG. 2 is an enlarged sectional view illustrating operation of the vent valve.

When the barrel 15 is pressed into the vent passage 13, a part of the barrel 15 may be deformed by the pressing force. Yet, the deformation goes only within the valve body storing portion 21 as shown in FIG. 2. The step portion 19 prevents deformation of the wall surface defining the valve body moving portion 20. Thus, deformation of a valve seat portion 22 around the valve opening 16, which is to be in contact with the steel ball 23, is prevented, thereby keeping sealing property of the valve seat portion 22.

The vent valve 14 having the foregoing construction is inserted into the vent passage 13 of the fuel pump 7 in such a manner that the valve opening 16 of the barrel 15 is directed upwardly. And, prior to starting the fuel pump 7, no fuel contained in the fuel passage 12 is supplied to the vent passage 13, hence, the steel ball 23 is at lowered position by its own weight, and the valve opening 16 is open.

Upon starting of the fuel pump 7, the fuel in the fuel passage 12 is supplied to the vent passage 13. Air in the fuel passage 12 and the vent passage 13 is ejected from the valve opening 16 to the fuel tank. And, when fuel is filled in the vent passage 13, the fuel pressure causes the steel ball 23 to go up and then to seat on the valve seat portion 22, thereby closing the valve opening 16 and inhibiting outflow of fuel from the vent passage 13. At this time, as the valve seat portion 22 has not been deformed, the steel ball 23 appropriately seats on the valve seat portion 22, resulting in positively closing the valve opening 16.

In addition, it will be easily understood that the present invention is not limited to the foregoing embodiment. It goes without saying that various variations are possible within the scope of the invention.

For example, the foregoing embodiment has been applied to a vent valve of the fuel pump, but it may be applied to any kind of vent valves for purging air out of a fluid passage.

As set forth above, the present invention includes a step portion formed on a barrel. Hence, it can prevent deformation of the barrel near a valve seat portion when the barrel is pressed into a vent passage, thus, the valve body positively closes a valve opening.

What is claimed is:

1. A vent valve comprising:
   a barrel, formed to be of substantially cylindrical form, one axial end of which constitutes a closed wall, and the other axial end of which is open, said barrel being inserted into a vent passage branched off from a liquid passage;
   a valve opening formed on the closed wall;
   a valve body inserted into said barrel; and
   a step portion provided on the outer periphery of said barrel on the valve opening side of said barrel, said step portion dividing the barrel into a smaller diameter portion and a larger diameter portion, said barrel being inserted into said vent passage by pressing the larger diameter portion of the barrel into the vent passage.

2. The vent valve as set forth in claim 1, wherein:
   said valve body is a sphere for opening or closing said valve opening in a manner to come into contact with or be isolated from a valve seat portion of the valve opening; and,
   said other axial end of said barrel has an opening, measurement which is smaller than a diameter of said sphere.

3. The vent valve as set forth in claim 2, wherein:
   said opening is formed such that three portions of said cylindrical barrel are so concave toward the inside of the barrel wherein measurement of the opening is smaller than the diameter of said sphere.

4. The vent valve as set forth in claim 1, wherein:
   said vent passage is a vent passage for a fuel pump and openly provided on one end of a housing of a vehicle fuel pump, said vent passage being branched off from an ejecting side fuel passage as said fluid passage.

5. The vent valve as set forth in claim 4, wherein:
   said one end of said housing is openly provided with said ejecting side fuel passage; and,
   the other end of the housing is openly provided with an intake side fuel passage.

6. The vent valve as set forth in claim 5, wherein:
   said one end of said housing is provided with a motor; and,
   the other end of said housing is provided with a vane pump.

7. A vent valve as set forth in claim 1, wherein an inside of the barrel is divided into a valve body moving portion where said valve body moves to close said valve opening, and a valve body storing portion having a larger diameter than the valve body moving portion.

* * * * *